(12) United States Patent
Goetz

(10) Patent No.: US 10,219,488 B2
(45) Date of Patent: Mar. 5, 2019

(54) DOWNED LIVESTOCK ANIMAL CARRIAGE ASSEMBLY

(71) Applicant: Dale A. Goetz, Park, KS (US)

(72) Inventor: Dale A. Goetz, Park, KS (US)

( * ) Notice: Subject to any disclaimer, the term of this patent is extended or adjusted under 35 U.S.C. 154(b) by 216 days.

(21) Appl. No.: 14/702,326

(22) Filed: May 1, 2015

(65) Prior Publication Data

US 2015/0250142 A1 Sep. 10, 2015

(51) Int. Cl.
*A01K 15/00* (2006.01)
*A61D 3/00* (2006.01)
*B66F 9/18* (2006.01)

(52) U.S. Cl.
CPC ............... *A01K 15/00* (2013.01); *A61D 3/00* (2013.01); *B66F 9/18* (2013.01)

(58) Field of Classification Search
CPC ........ A01K 15/00; A01K 1/0613; A61D 3/00; A61H 2203/03
USPC ................. 119/728; 54/79.1, 79.2; 5/81.1 R; 294/74
See application file for complete search history.

(56) References Cited

U.S. PATENT DOCUMENTS

| 1,064,367 | A | * | 6/1913 | Mussleman | .......... | A01K 1/0613 |
| | | | | | | 119/725 |
| 1,621,760 | A | | 3/1927 | Stader et al. | | |
| 2,813,745 | A | * | 11/1957 | Frieder | ................... | B66C 1/127 |
| | | | | | | 294/77 |
| 2,942,575 | A | | 6/1960 | Boyd et al. | | |
| 2,976,840 | A | | 3/1961 | Hugus | | |
| 3,085,553 | A | | 4/1963 | Anderson | | |
| 4,070,721 | A | * | 1/1978 | Stasko | ................. | A61G 7/1017 |
| | | | | | | 5/89.1 |
| 4,159,840 | A | * | 7/1979 | Fengels | ..................... | B66C 1/18 |
| | | | | | | 294/77 |
| 4,186,689 | A | | 2/1980 | Alexander et al. | | |
| 4,432,306 | A | | 2/1984 | Rossa | | |
| 4,489,677 | A | | 12/1984 | Handley | | |
| 4,550,686 | A | | 11/1985 | Munks | | |

(Continued)

FOREIGN PATENT DOCUMENTS

GB 2252543 A 12/1992
NZ 2006059247 10/2008

*Primary Examiner* — Marc Burgess
(74) *Attorney, Agent, or Firm* — Kenneth H. Jack; Davis & Jack, L.L.C.

(57) ABSTRACT

An assembly for forklift tine carriage of a downed livestock animal, the forklift including a lateral tine and an oppositely lateral tine, the assembly incorporating a durable flexible sheet having longitudinal and oppositely longitudinal edges; longitudinal and oppositely longitudinal pairs of "D" loops respectively fixedly attached to the durable flexible sheet at its longitudinal and oppositely longitudinal edges; longitudinal and oppositely longitudinal stays respectively extending through the longitudinal and oppositely longitudinal pairs "D" loops; and lateral and oppositely lateral pairs of durable flexible loops engaging the longitudinal and oppositely longitudinal stays, the lateral and oppositely lateral pairs of durable flexible loops being slidably positionable along the longitudinal and oppositely longitudinal stays for, upon longitudinal movements of the lateral and oppositely lateral forklift tines over the durable flexible sheet, respectively engaging the lateral and oppositely lateral forklift tines.

3 Claims, 6 Drawing Sheets

(56) References Cited

U.S. PATENT DOCUMENTS

| | | | |
|---|---|---|---|
| 4,723,327 A * | 2/1988 | Smith | A61G 7/1026 |
| | | | 294/140 |
| 4,767,099 A | 8/1988 | Munks | |
| 4,829,937 A | 5/1989 | Weelink | |
| 4,831,967 A * | 5/1989 | Anderson | A01K 15/00 |
| | | | 119/725 |
| 5,125,220 A * | 6/1992 | Martin | A01K 13/008 |
| | | | 54/79.2 |
| 5,842,443 A | 12/1998 | Steinfort | |
| 5,978,989 A * | 11/1999 | Chavez | A61G 1/01 |
| | | | 5/625 |
| 6,289,534 B1 * | 9/2001 | Hakamiun | A61G 7/1017 |
| | | | 5/83.1 |
| 6,463,886 B1 | 10/2002 | Rodden et al. | |
| 6,530,195 B1 * | 3/2003 | Summerfield | B68C 1/04 |
| | | | 54/37.1 |
| 6,595,162 B1 | 7/2003 | Hibbert | |
| 7,389,749 B1 * | 6/2008 | Choate | A61D 3/00 |
| | | | 119/726 |
| D583,518 S * | 12/2008 | Thorner | D30/151 |
| 7,726,710 B2 * | 6/2010 | Handwerker | E04G 21/24 |
| | | | 294/215 |
| 7,886,948 B2 | 2/2011 | Kerr | |
| 8,474,412 B1 | 7/2013 | Walden | |
| 2005/0005875 A1 * | 1/2005 | Suggs | A01K 13/001 |
| | | | 119/728 |
| 2005/0076853 A1 * | 4/2005 | Leo | A01K 1/0263 |
| | | | 119/497 |
| 2007/0209603 A1 | 9/2007 | Steinfort | |
| 2012/0037089 A1 | 2/2012 | Puhl | |
| 2014/0083369 A1 | 3/2014 | Marks | |
| 2016/0302902 A1 * | 10/2016 | Wolfsberger | A61G 7/1019 |

\* cited by examiner

DOWNED LIVESTOCK ANIMAL CARRIAGE ASSEMBLY

FIELD OF THE INVENTION

This invention relates to apparatus and assemblies which are adapted for humane carriage and removal of sick and injured or downed large livestock animals. More particularly, this invention relates to such assemblies which are adapted to operate as an auxiliary component in conjunction with mobile mechanized vehicles such as forklift loaders and tractors.

BACKGROUND OF THE INVENTION

Livestock operations which are conducted at feedlots, livestock auctions, and holding yards, and corrals serving livestock shipping and slaughter houses commonly group large numbers of cattle together. During such operations, a bull, steer, or cow occasionally becomes weakened due to illness or injury, and is unable to stand. Such livestock constitute downed animals which are necessarily transported away from the holding yard or corral for care, treatment, or other processing.

Attachment of a tow rope directly to the downed animal's legs allows for towing removal of the downed animal. However, such transport method undesirably poses a risk of further injury to the downed animal.

The instant inventive assembly for carriage of a downed livestock animal solves or ameliorates the problems discussed above by providing specially configured flexible sheet, "D" loop, stay bars, and suspension loops which are capable of engaging the tines of a forklift for humane sling carriage of the downed animal.

BRIEF SUMMARY OF THE INVENTION

In the instant inventive assembly for forklift tine carriage of a downed livestock animal, the subject downed livestock animal typically constitutes an injured or ill cow, calf, steer, or bull which is unable to stand. Notwithstanding, the scope of the invention extends to other large animals which are unable to stand are in need of humane transport.

In a preferred embodiment of the invention, the tines which are utilized for suspending carriage of the animal are those of a forklift auxiliary implement which is attachable to the lift arms of a common skid steer loader. Suitably, other types of mobile mechanized equipment, such as a tractor front loader, which are capable of deploying lateral forklift tines may be utilized and fall within the scope of the invention.

A first structural component of the instant inventive assembly comprises a durable flexible sheet having longitudinal and oppositely longitudinal edges, and having orthogonally arranged lateral and oppositely lateral edges. In a preferred embodiment, the durable flexible sheet component comprises nylon fiber reinforced vulcanized rubber and has a thickness of $3/8"$-$5/8"$. Suitably, other durable sheet material such as heavy duty woven canvas may be alternatively utilized. In the preferred embodiment, the durable flexible sheet is substantially square and has a side dimension of five feet to eight feet.

A further structural component of the instant inventive assembly comprises longitudinal and oppositely longitudinal pairs of "D" loops, the longitudinal pair of "D" loops preferably being fixedly attached to the durable flexible sheet at and along its longitudinal edge, and the oppositely longitudinal pair of "D" loops being fixedly attached to the durable flexible sheet and along its oppositely longitudinal edge. In the preferred embodiment, each "D" loop is capable of pivoting between a normal position extending orthogonally or substantially 90° from the carrying face of the durable flexible sheet, and a retracted position wherein the "D" loops unobtrusively co-extend along such face. Such pivoting character of the "D" loops advantageously allows a downed animal to be rolled from the ground and onto the durable flexible sheet without any sharp impingements of "D" loops against the animal's torso.

Further structural components of the instant inventive assembly comprise longitudinal and oppositely longitudinal stay members which are fitted and sized for respective lateral extensions through the longitudinal and oppositely longitudinal "D" loop pairs. In a preferred embodiment, the longitudinal and oppositely longitudinal stay members comprise heavy duty steel bars having lengths slightly greater than the edge dimension of the durable flexible sheet.

Further structural components of the instant inventive assembly comprise lateral and oppositely lateral pairs of durable flexible loops which are attached in engagement with the longitudinal and oppositely longitudinal stays. In a preferred embodiment, the durable flexible loops comprise high tensile strength chains having releasable links.

In the preferred embodiment, the lateral and oppositely lateral pairs of durable flexible loops encircle and are slidably positionable along the longitudinal and oppositely longitudinal stays. Upon such flexible loop mounting, and upon simultaneous longitudinal movement of, for example, a skid steer loader's overlying lateral and oppositely lateral forklift tines, the lateral and oppositely lateral flexible loop pairs may respectively engage such tines.

Preliminary to the stay bar, flexible loop, and forklift tine engagements, a downed animal such as an injured steer may be rolled over the ground and onto the upper face of the durable flexible sheet. Thereafter, stay bars and flexible loops may be installed in the manner described above. Thereafter, an operator of a forklift equipped skid steer loader may maneuver the forklift so that its tines straddle the downed animal over the durable flexible sheet. Upon such positioning, the durable flexible loops may be configured so that each encircles one of the stay bars and one of the forklift tines. Thereafter, the operator may easily and conveniently raise the skid steer's boom arms while operating the machine's bucket rams to keep the forklift tines slightly tilted upwardly. Such skid steer loader operation advantageously simultaneously raises the durable flexible loops, the longitudinal and oppositely longitudinal stay members, the longitudinal and oppositely longitudinal "D" loop pairs, the durable flexible sheet, and the injured steer in the manner of a sling carrier. Upon raising of the assembly above the ground, the skid steer operator may easily, conveniently, and humanely drive the machine and the carried animal to a remote location for care and processing.

Accordingly, objects of the instant invention include the provision of an assembly for forklift tine carriage of downed livestock animals which incorporate structures, as described above, and which arranges those structures in relation to each other, as described above, for performance of the beneficial functions described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
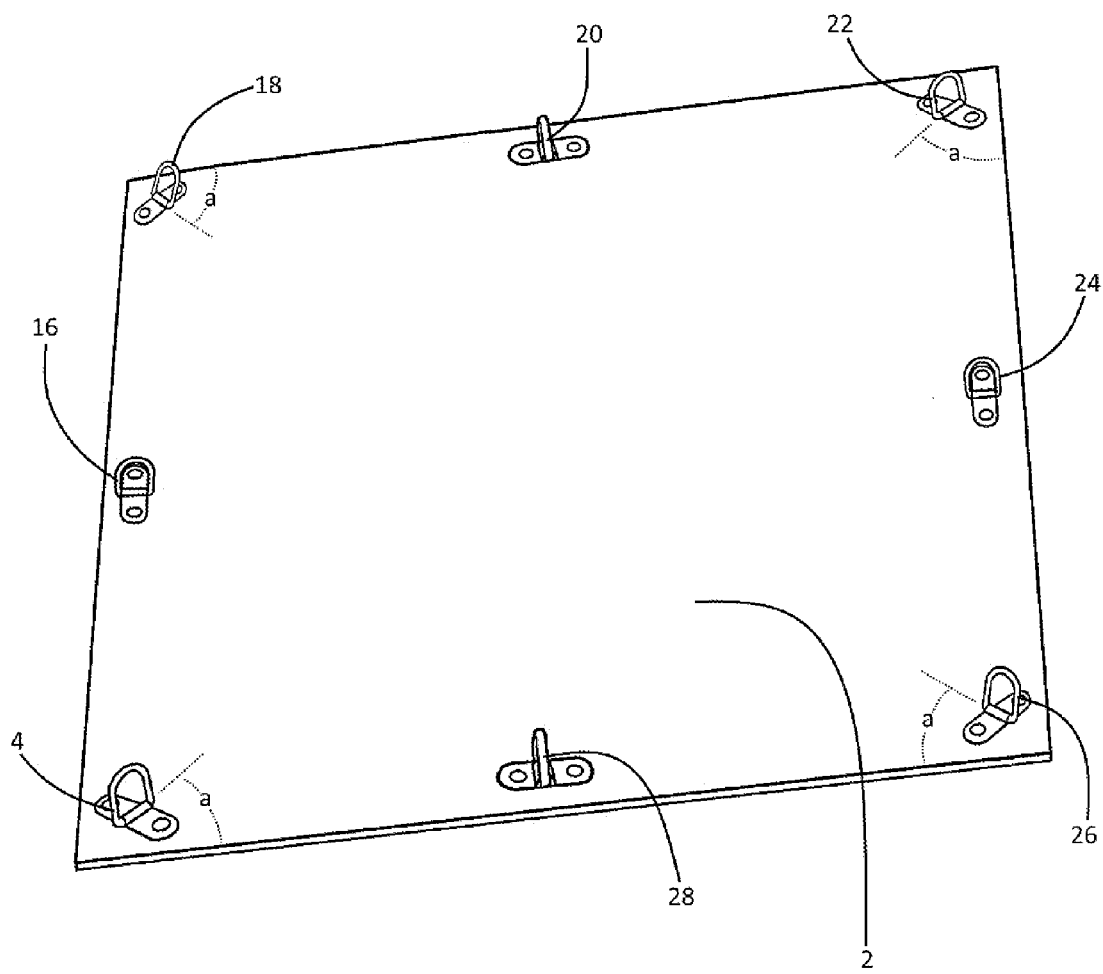
FIG. 1 is a perspective view of a durable flexible sheet component of the instant inventive assembly for forklift tine carriage of a downed livestock animal.

Referring now to the drawings and in particular to Drawing FIG. 1, a durable flexible sheet component 2 is preferably substantially square, such component having four substantially orthogonal edges forming 90° corners. In a preferred embodiment, the lengths of the sides of the durable flexible sheet component 2 are between five feet and eight feet. The sheet 2 is ⅜" to ⅝" thick, and preferably is composed of nylon fiber reinforced vulcanized rubber. Suitably, the durable flexible sheet 2 may be alternatively composed of other durable sheet materials such as heavy duty woven canvas.

Figure 3:
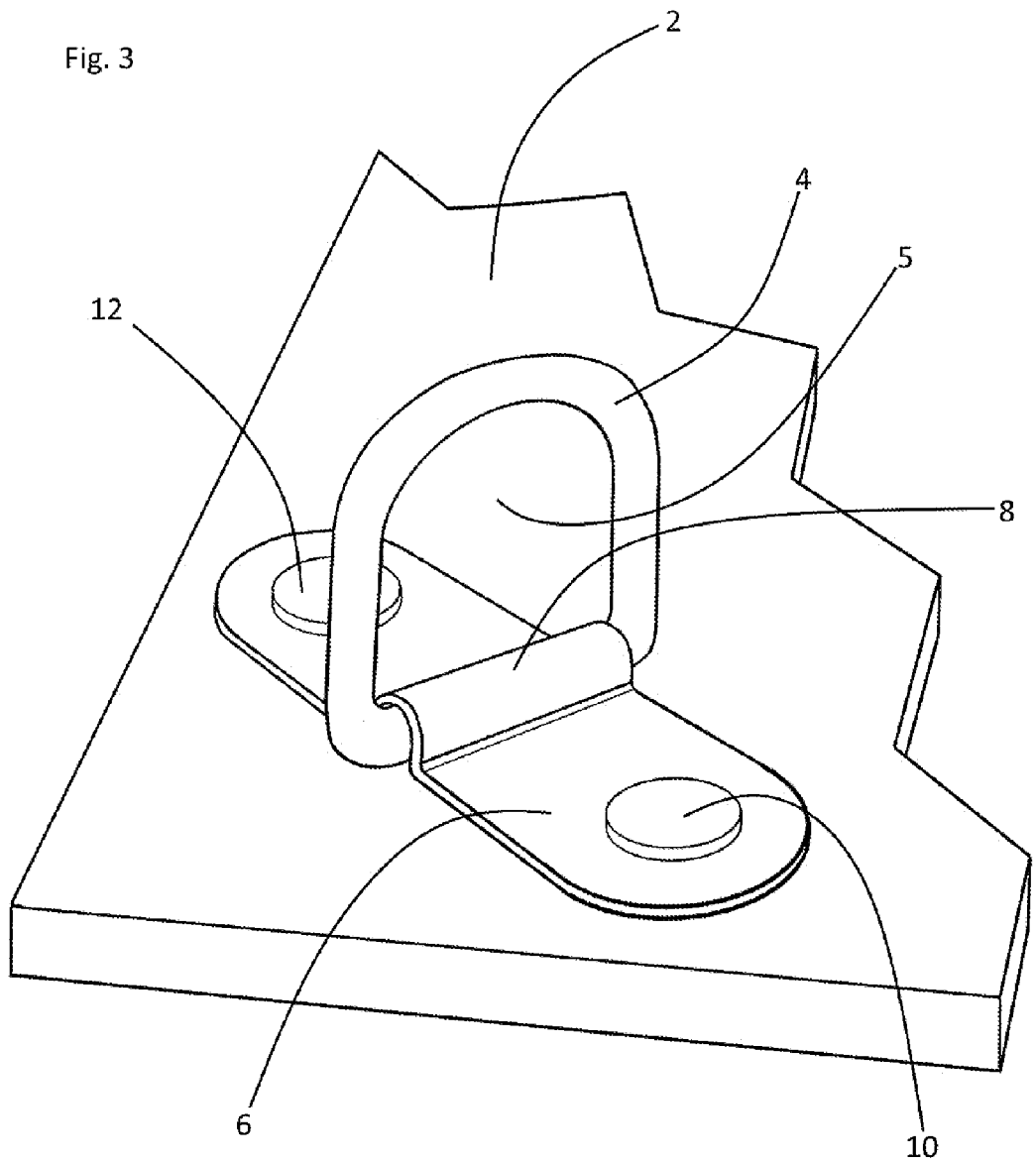
FIG. 3 is a magnified partial view of the structure depicted in FIG. 1.
Figure 5:
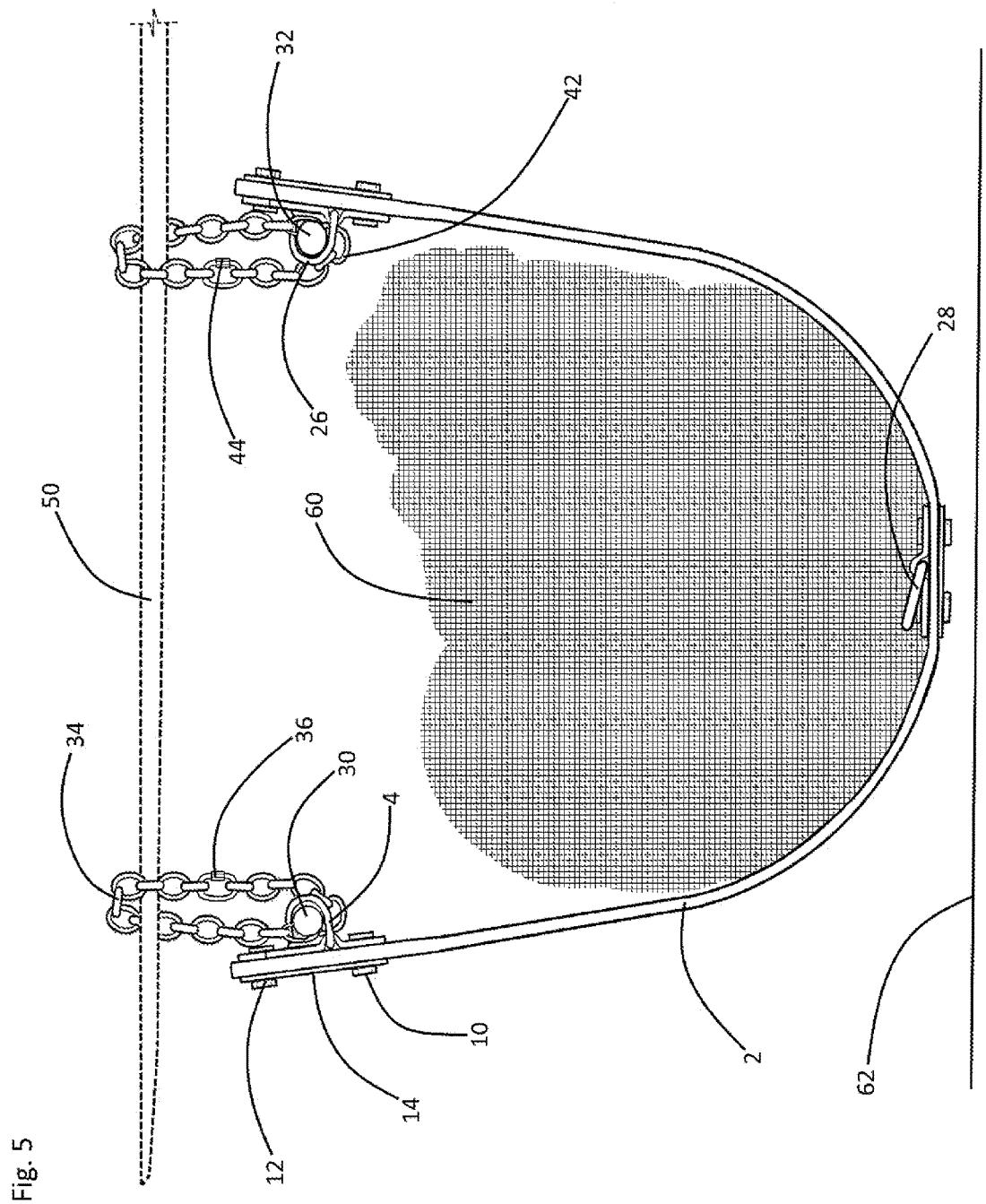
FIG. 5 is a side view of the structure depicted in FIG. 4, the view of FIG. 5 showing an exemplary downed livestock animal raised by the assembly.

Referring to FIG. 1, the instant inventive assembly preferably further incorporates longitudinal and oppositely longitudinal pairs of "D" loops 4,18 and 26,22. Referring further simultaneously to FIGS. 1, 3, and 5, each "D" loop preferably comprises upper and lower bracket plates 6 and 14. In the preferred embodiment, the upper bracket plates 6 forming central hinge channels 8 for capture of and pivoting receipts of base ends of "D" loops, loop 4, 16, 18, 20, 22, 24, 26, and 28. Bolt fasteners 10 and 12 extend through eyes (not shown within views) within the durable flexible sheet 2, such fasteners engaging underlying bracket plates 14 and securely fastening the "D" loops at the periphery of the durable flexible sheet 2.

Figure 2:
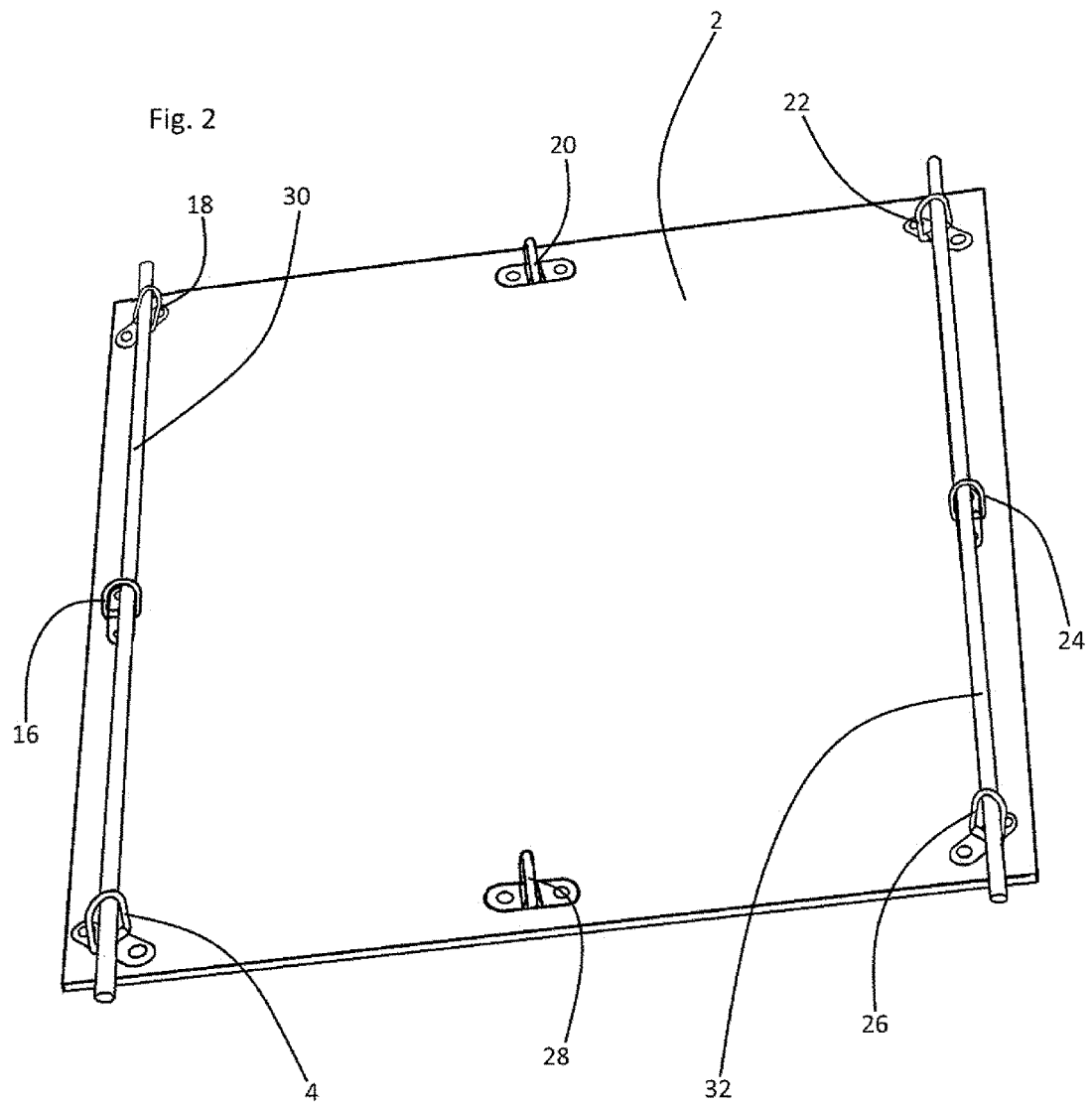
FIG. 2 redepicts the structure of FIG. 1, the view showing incorporation of steel bar stay components.

Referring simultaneously to FIGS. 1 and 2, the instant invention further comprises longitudinal and oppositely longitudinal stays 30 and 32. Such stays 30 and 32 preferably comprise heavy duty steel bars having lengths slightly greater than the edge length of the durable flexible sheet 2. In a preferred mode of assembly, the steel bar stays 30 and 32 are respectively laterally extended through the longitudinal "D" loop pair 18 and 14, and through the oppositely longitudinal "D" loop pair 22 and 26.

Figure 4:
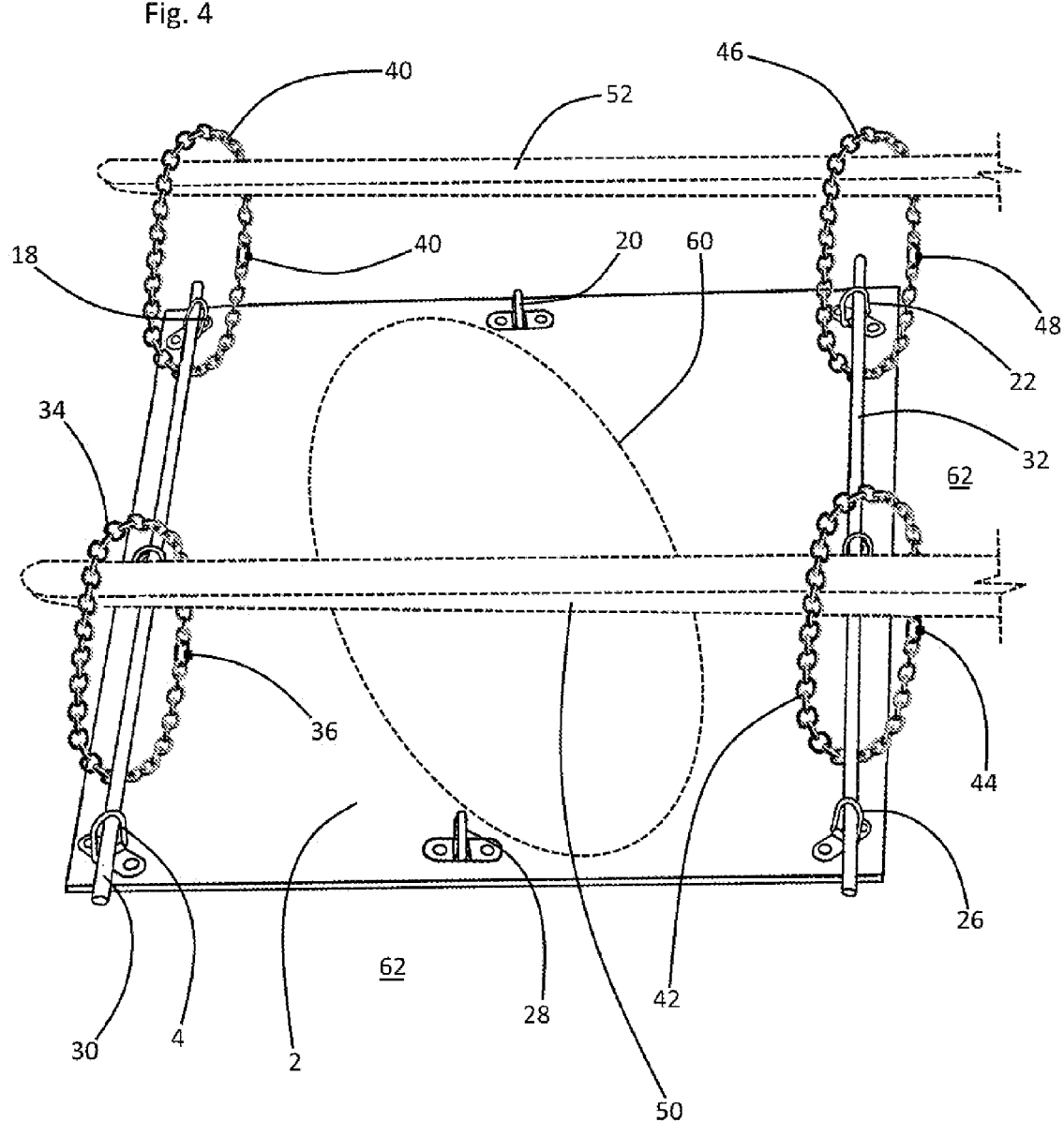
FIG. 4 redepicts the structure of FIGS. 1 and 2, the view of FIG. 4 further showing installation of durable flexible loop components and showing their engagements with forklift tine components.

Referring simultaneously to FIGS. 2 and 4, lateral and oppositely lateral pairs of durable flexible loops 34 and 42, and 40 and 46 are preferably provided, such loop pairs engaging the longitudinal and oppositely longitudinal steel bar stays 30 and 32 for lateral slidable movements and positioning therealong. In the preferred embodiment, the durable flexible loops 34 and 42, and 40 and 46 comprise high tensile strength steel chains which incorporate releasable links 36, 44, 40, and 48.

Upon overlying and longitudinal movements of lateral and oppositely lateral forklift tines 50 and 52 (such tines being deployed and operated via, for example, a skid steer loader having an auxiliary forklift attachment), the lateral and oppositely lateral pairs of durable flexible loops 34,44 and 38,46 may be respectively extended in encircling engagements with such tines 50 and 52 in the manner depicted.

Referring simultaneously to FIGS. 4 and 5, a downed large livestock animal such as a steer 60 (represented in dashed lines or ghost) may be preliminarily rolled over the ground 62 and onto the upper surface of the durable flexible sheet 2. The pivot capabilities of the "D" loops 4, 16, 18, 20, 22, 24, and 28 advantageously allow movements between retracted positions (as represented by loop 28 in FIG. 5) which co-extend with the sheet 2 and upwardly extending or substantially 90° bar receiving positions (as depicted in FIG. 4). Such pivoting capabilities of the "D" loops advantageously allow a downed livestock animal 60 to be rolled directly over the "D" loops without any severe impingements of the loops against the animal's torso.

Referring further simultaneously to FIGS. 4 and 5, operation of the forklift (not depicted within views) to raise the lateral and oppositely lateral forklift tines 50 and 52 may advantageously simultaneously raise the durable flexible loops 36,44 and 40,46, the stay bars 30 and 32, the longitudinal and oppositely longitudinal "D" loop pairs 4,18 and 26,22, the durable flexible sheet 2, and the downed livestock animal 60 over the ground 62 as indicated in Drawing FIG. 5. Thereafter, the operator of such forklift equipment may easily and conveniently drive the assembly, including the carried animal 60, to an appropriate place of care and processing.

Referring simultaneously to FIGS. 1-3 and 6, it may be seen that each "D" loop among the longitudinal and oppositely longitudinal "D" loop pairs 4,18 and 26,22 is oriented and positioned at an angle "a" with respect to one of the sheet's corners. Such angled positioning of the "D" loops 4, 18, 22, and 26 advantageously causes their loop openings 5 to simultaneously face both corner edges for alternative bi-directional receipts of the stay bars. To facilitate such bi-directional stay bar receipts, each angle "a" is preferably approximately 45°. Such corner "D" loop orientations allow the "D" loops to functionally serve as lateral and oppositely lateral "D" loop pairs 4,26 and 18,22. Such alternate lateral and oppositely lateral "D" loop pairs 4,26 and 18,22 may advantageously alternatively longitudinally receive the steel bar stays 30 and 32 in the manner depicted in FIG. 6. The instant invention's alternative provisions of longitudinal and oppositely longitudinal and lateral and oppositely lateral pairs of "D" loops advantageously allows forklift tines 50 and 52 to be extended either longitudinally or laterally for with respect to the sheet 2 loop engagements and sling carriage of a downed livestock animal.

Figure 6:
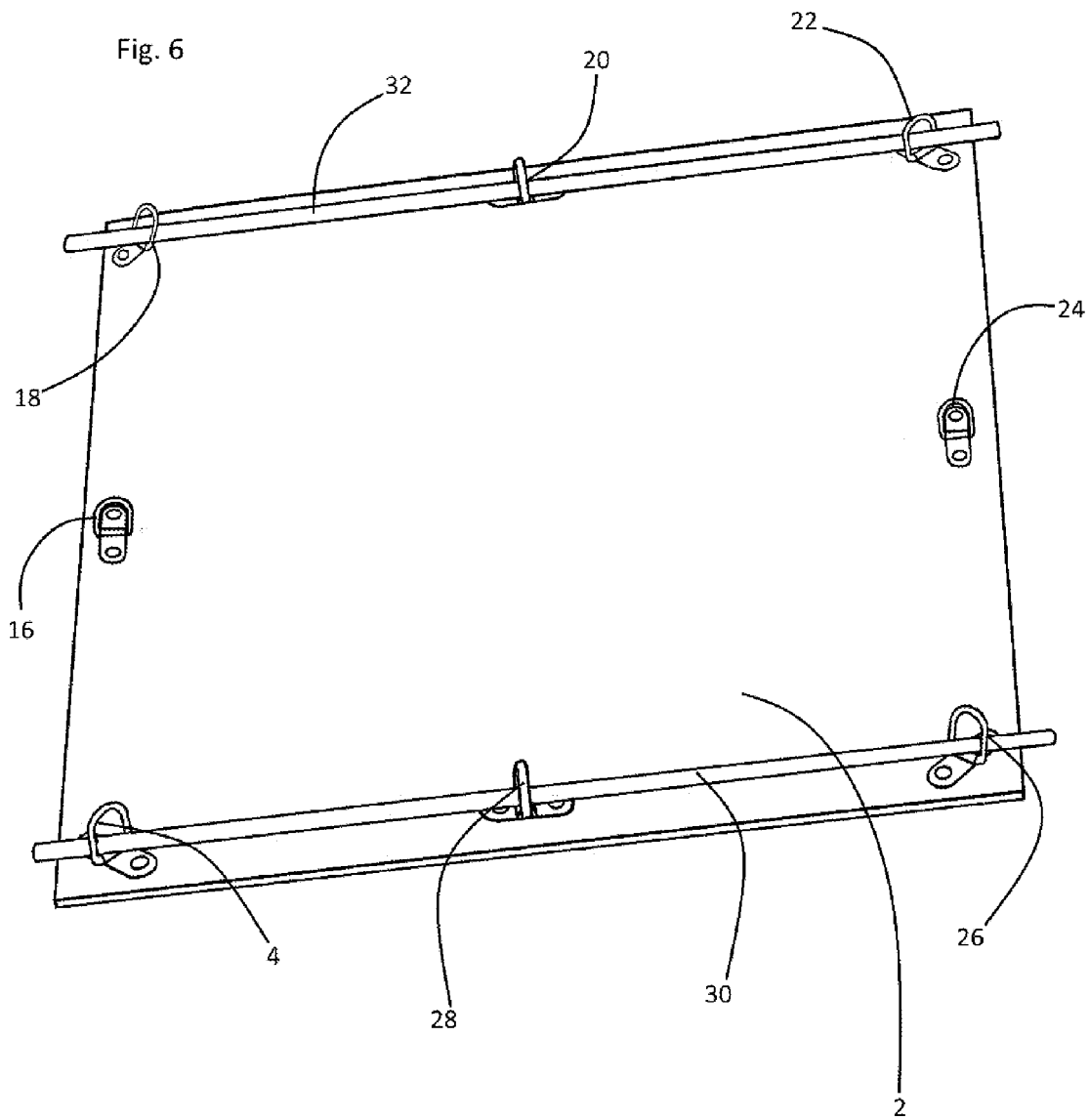
FIG. 6 presents an alternate configuration of the structure of FIG. 2.

Referring simultaneously to FIGS. 1, 2, and 6, a plurality of intermediate "D" loops 16, 20, 24, and 28 are preferably provided, such intermediate "D" loops engaging midpoints of stay bars 30 and 32 in the alternate manners indicated in FIG. 2 and FIG. 6. The engagements of the intermediate "D" loops 16, 20, 24, and 28 with the stay bars 30 and 32 advantageously provide for consistent livestock carrying suspension and support along the edges of the durable flexible sheet 2.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustra- The invention hereby claimed is:

1. An assembly for forklift tines carriage of a downed livestock animal comprising:
   (a) a rectangular durable flexible sheet having an animal carrying face, having an opposing pair of lateral edges, having an opposing pair of longitudinal edges, and having four corners;
   (b) four corner pivot brackets fixedly attached to the animal carrying face, said brackets being positioned thereon so that one of said brackets resides at each of the rectangular durable flexible sheet's corners;
   (c) four corner "D" loops, each corner "D" loop being rigid, forming a stay receiving opening, and having a base which is pivotally received by one of the corner pivot brackets, the pivotal receipt of said each corner "D" loop's base facilitating pivoting movements between retracted and normal positions wherein said each corner "D" loop coextends along the animal carrying face upon a pivoting movement to the retracted position, wherein said each corner "D" loop's stay receiving opening has a periphery which is bounded by said each "D" loop and by the one of the corner pivot brackets, wherein said each "D" loop's periphery is continuous, and wherein said each rigid "D" loop extends upwardly from the animal carrying face upon a pivoting movement to the normal position;
   (d) a pair of rigid stays, each stay among the pair of rigid stays extending along one of the edges among the rectangular durable flexible sheet's opposing pair of lateral edges, said each stay being received by a normally pivoted and laterally positioned pair of loops among the four corner "D" loops;
   (e) a plurality of durable flexible loops engaging the pair of rigid stays, the durable flexible loops being positioned for engaging the forklift tines; wherein the positioning of four corner pivot brackets upon the animal carrying face orients each of the four corner pivot brackets thereon at approximately 45° for, upon an alternative extension of said each stay along one of the edges among the rectangular durable flexible sheet's opposing pair of longitudinal edges, facilitating receipts of said each stay by a normally pivoted and longitudinally positioned pair of loops among the four corner "D" loops, and
   (f) a plurality of intermediate brackets, each intermediate bracket having a pivoting "D" loop and being positioned between a pair of the corner "D" loops, each intermediate bracket aligning with one of the edges among the durable flexible sheet's opposing pairs of lateral and longitudinal edges.

2. The assembly of claim 1 wherein each durable flexible loop comprises a chain having a releasable link.

3. The assembly of claim 2 wherein the pair of rigid stays comprise a pair of steel bars.

* * * * *